METHOD OF MAKING BASES FOR PRINTED ELECTRIC CIRCUITS

Filed Sept. 30, 1957 2 Sheets-Sheet 1

INVENTOR.
Thomas L. Robinson
BY
Parker, Prochnow & Farmer
Attorneys.

METHOD OF MAKING BASES FOR PRINTED ELECTRIC CIRCUITS

Filed Sept. 30, 1957 2 Sheets-Sheet 2

INVENTOR.
Thomas L. Robinson,
BY Parker & Prochnow,
Attorneys.

United States Patent Office 3,060,076
Patented Oct. 23, 1962

3,060,076

METHOD OF MAKING BASES FOR PRINTED ELECTRIC CIRCUITS

Thomas L. Robinson, Buffalo, N.Y., assignor to Automated Circuits, Inc., North Tonawanda, N.Y.
Filed Sept. 30, 1957, Ser. No. 687,291
5 Claims. (Cl. 156—252)

This invention relates to printed electric circuits and particularly to the formation of printed circuits with holes in the bases on which the circuits are printed, whereby current may pass from one side or face of a printed sheet or base to the other. This application is a continuation-in-part of my copending application No. 567,205, filed February 23, 1956, and now abandoned.

In the making of printed circuits, it is frequently desirable to print parts of circuits on opposite faces of an insulating sheet or base, and also to provide for connecting the circuit printed on one face of the base to the circuit on the other face, this being generally done by providing holes in the base. Heretofore holes have been formed in the insulating bases of printed circuits by punching, drilling or by similar operations, but since the location of the holes in the circuits required that they be located in accurate relation to each other, the accurate forming of these holes sometimes involved not only difficulty, but alos considerable expense.

It is one of the objects of this invention to provide an improved method of forming holes in the bases of printed circuits by means of methods similar to printing methods, thereby greatly reducing the cost of forming holes or irregular edge portions on the bases of the printed circuits.

It is also an object to provide by means of printing and electroplating holes and current conducting linings for the holes in the base of a printed electric circuit, through which current may be conducted from one side of the base to the opposite side.

It is a further object of this invention to provide a process by means of which the combination and alinement of electric circuits with the formation of holes in the bases of the printed circuit may be carried on simultaneously so as to effect a material saving in the cost of printed circuits.

A further object is to provide electric circuit bases of material which may be of substantial thickness and strength and in which holes or edges of any desired shapes or dimensions may be formed.

In the accompanying drawings, I have illustrated my invention as applied to a simple electric circuit, but it will be understood that my invention may be applied to any desired printed circuit. For these drawings.

FIGS. 4 to 8 inclusive are similar sectional views showing in succession various other steps of the process.

Figures 1, 2, 3, 4, 5, 6, 7, 8, 9:
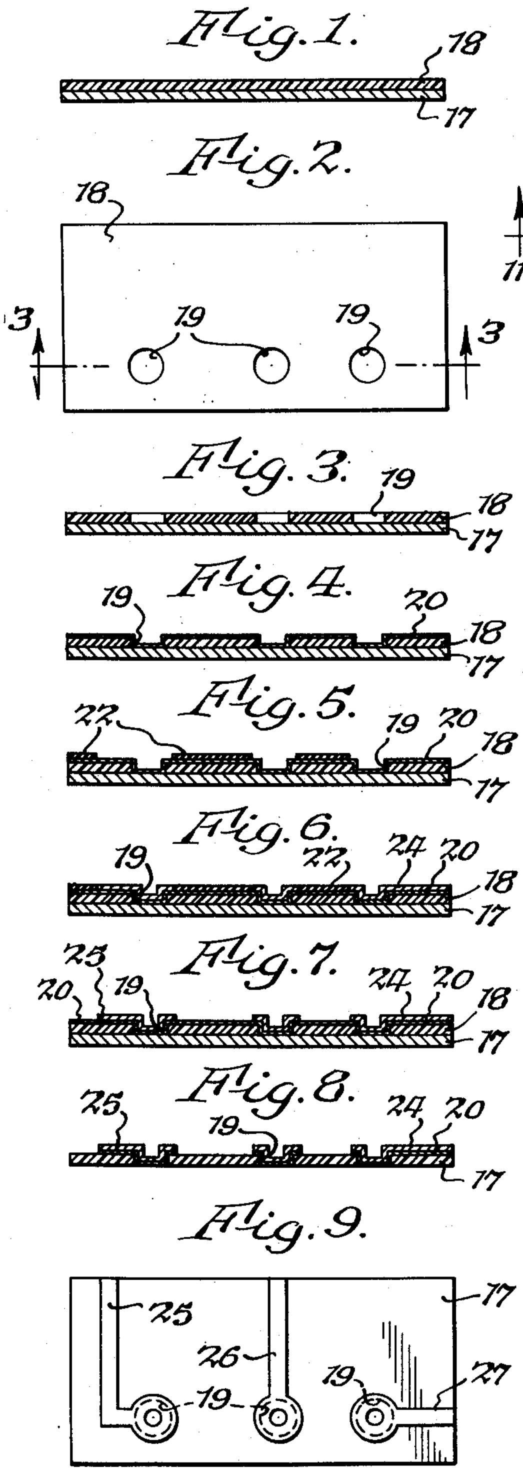
FIG. 1 is a cross section showing a base for a printed circuit having a layer of semi-liquid insulating material applied thereto.
FIG. 2 is a top plan view thereof after some of the semi-liquid material has been removed.
FIG. 3 is a sectional view thereof, on line 3—3, FIG. 2.

FIG. 9 is a top plan view of a printed circuit.

Figures 10, 11, 12, 13, 14:
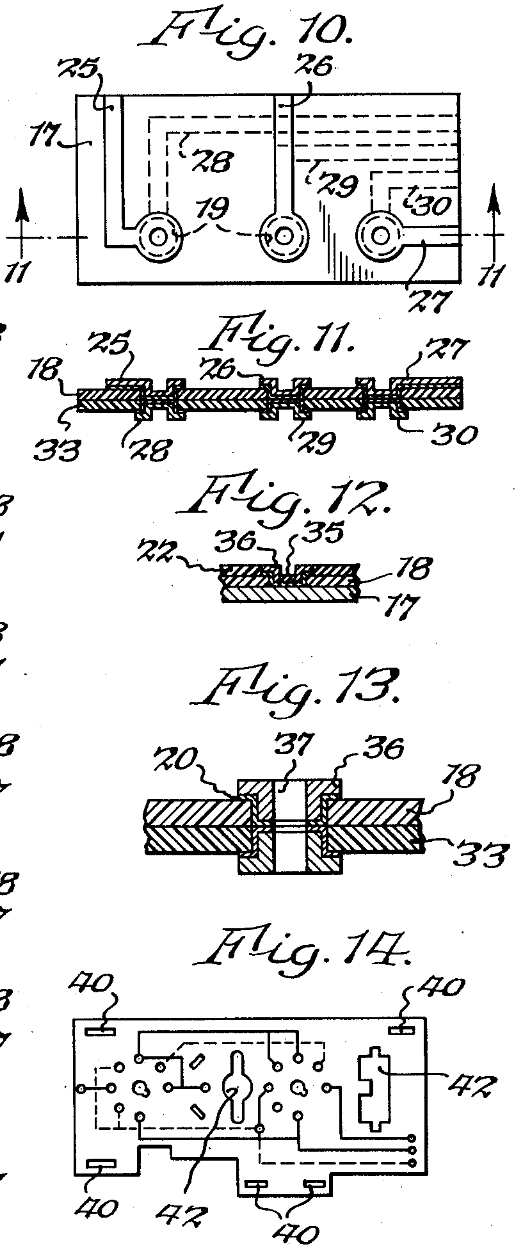

FIG. 10 is a similar view of the same printed circuit having another printed surface secured to the back thereof.

FIG. 11 is a transverse section thereof. on line 11—11, FIG. 10.

FIG. 12 is a fragmentary cross sectional view of a part of a printed circuit of modified construction.

FIG. 13 is a fragmentary view, on an enlarged scale, of a printed circuit having a hole extending through the bases of both circuits.

FIG. 14 is a face view showing by way of example a modified type of circuit which may be made in accordance with my improved method.

Figure 15:
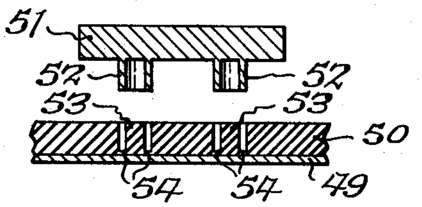

FIG. 15 is a sectional elevation of a die and a carrier and base material thereon which has been subjected to the action of a die.

Figure 16:
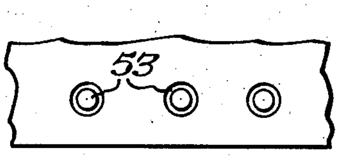

FIG. 16 is a plan view of the base material shown in FIG. 15.

Figure 17:
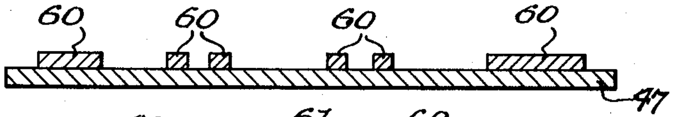

FIG. 17 is a fragmentary sectional elevation of a printed circuit on a carrier to be incorporated in one face of a base.

Figure 18:
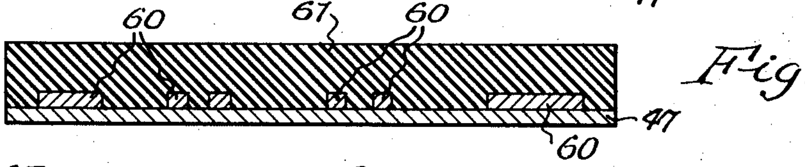

FIG. 18 is a fragmentary sectional view showing a layer of resin material to form a base and applied to the circuit shown in FIG. 17.

Figure 19:
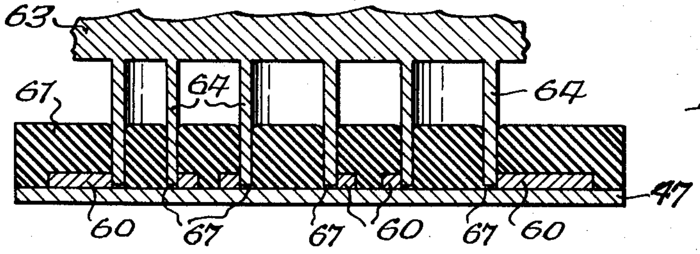

FIG. 19 is a fragmentary sectional elevation showing the circuit and base as in FIG. 18, and showing a printing die pressed into the material of the base.

Figure 20:
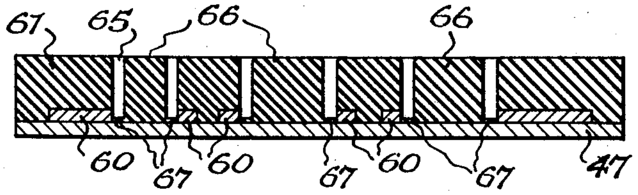

FIG. 20 is a similar sectional elevation showing the base after the die has been withdrawn therefrom.

Figure 21:
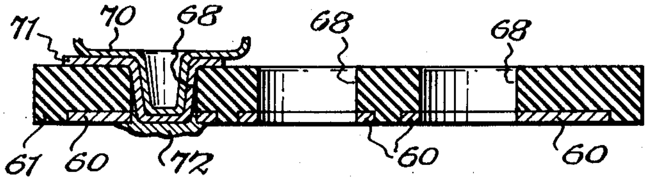

FIG. 21 is a fragmentary view of the printed circuit and base after the cores and the carrier of the printed circuit have been removed therefrom.

Figure 22:
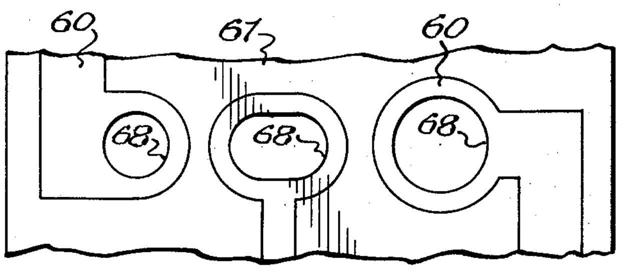

FIG. 22 is a fragmentary face view of the base having plated metal conductors formed thereon and also provided with holes through which current may be conducted from one face of the base to the other face thereof.

According to my improved process I select for the base through which holes or other configurations are to be applied a material which is initially semi-liquid or thixotropic and becomes solidified either by heat or at room temperature. I operate on this material before the same becomes hardened, which makes it possible for me to use relatively inexpensive plates or dies of the kind used in printing and which may be made by photographic or other methods.

My improved printed circuit, as illustrated in FIGS. 1–14, is initially built up on a carrier sheet 17 which may be of any suitable material for temporarily supporting my improved printed circuit during a part of the production of the same. This carrier may be a layer of cellophane or any other thin film, or it may be a plate of rigid material such, for example, as glass. The first step in my improved method is to apply to this carrier a coating 18 in semi-liquid state of a resin or adhesive of a type which becomes solidified either by heating the same or at room temperature, and which when solidified is non-conductive of electricity and forms the base which supports the printed circuit.

While this coating 18 is still in semi-liquid state, I remove parts of this layer or coating at the places thereon in which holes are to be formed or where a part of the edge is to be removed. This may most readily be done by means of a printing plate such, for example, as the type shown in my copending application, Ser. No. 326,679, now Patent No. 2,943,956, granted July 5, 1960, by providing a printing plate having outwardly extending portions suitable for contacting with the coating 18 and to which coating, while in semi-liquid form, will adhere, so that parts of this coating may be removed from the base at those portions of the same which are to form holes or depressions in the base. For example, in the construction shown, holes 19 are formed in the coating by removing material therefrom. The coating material is then allowed to dry, cure or otherwise harden, so that the article will then have the appearance as illustrated by way of example in FIGS. 2 and 3.

It is also possible to apply the semi-liquid coating to the carrier by direct printing by means of a printing plate which would produce the surface of semi-liquid material as shown in FIG. 2. However, this direct printing would result in a very thin coating 18, which coating when solidified would be quite fragile and, while usable for certain printed circuits, might not be suitable for others. By brushing or spraying a coating on a carrier, the coating may be made much thicker than by direct printing, and if the printing plate does not remove all the required material from the holes 19 in one stroke, the printing plate, after the coating adhering thereto is wiped off, can again be pressed against the carrier to remove more material therefrom. Furthermore, when this printing plate is pressed against the carrier, it squeezes the material from the holes 19 laterally to form slight beads (not shown) around the holes, which serve to reinforce the base.

The next step in the operation consists in applying a conductive metal film 20 to the entire surface of the cooating material and extending into the holes 19 therein. This may readily be done by spraying a film of silver or other metal solution and a reducing agent on the coating.

In the next step an electrically, non-conducting material commonly referred to as a "plating resist" 22 is applied to those areas of the conductive metal film which are not to be built up by a subsequent electroplating operation. This resist 22 is preferably applied by printing and is not applied to the parts of the conductive film 20 which extends into or around the holes or recesses, since it is desired to have the conducting material in these molds exposed for electroplating. Any other parts of circuits may be provided for at the same time by so applying the plating resist by means of the same printing plate as to leave spaces or openings, such as grooves or slots in the plating resist through which metal may be plated on the layer 20, or if desired, such other circuit parts may be applied later. The article then has approximately the appearance in cross section as shown in FIG. 5. It will be understood, of course, that in all of these cross sectional views the thickness of the materials is greatly exaggerated.

The article is then subjected to the usual electroplating process during which all areas are not covered by the plating resist will be coated with copper or other metal to the desired thickness, as indicated at 24, so that the article will then have an appearance as indicated in FIG. 6.

In the next step of the process, the plating resist is removed in any usual or suitable manner, thus leaving the article as indicated in FIG. 7. The coating or base 18 is then removed from the carrier 17 and the portion of the conductive metal film 20 which was covered by the plating resist, is also removed. This can easily be done by brushing or by chemical action. The article will then be as shown in FIGS. 8 and 9, in which 25, 26 and 27 represent conductors which connect with the conducting material surrounding the holes in the base and which may have been formed by providing grooves or openings in the plating resist 22 during the application of the same as in FIG. 5.

In the next step in the process, another printed sheet or base having other circuits printed thereon and having holes or recesses formed therein to coincide with the holes 19 in the printed circuit which has been described, is applied to the back face thereof, so that the holes in the two sheets will be arranged back to back. Before doing so, it may be desirable to apply solder to the backs of the metallic material in these holes before they are put together so that when heat is applied to the metal in the holes, the metal parts will be secured together. Alternately, it is also possible to fasten the metal at the backs of these holes together by welding. FIGS. 10 and 11 show the printed circuit, when the base 18 and another base 33 have been secured together. In FIG. 10, the broken lines indicate conductors 28, 29 and 30 on the back plate or base member 33. The printed circuit as shown in FIGS. 10 and 11 is then ready for use, and it may, of course, have a large number of other conductors printed on the bases in any usual or well known manner.

It is sometimes desirable that conductors be inserted into the holes formed in the bases, so that the holes in the two base when secured togethr extend completely through the bases. This can be easily effected by printing as shown in FIG. 12, in which the printing plate which applies the resist 22 as described in connection with FIG. 5, also applies resists 35 in the middle portions of the holes in the bases. When this is done, the metal 36 deposited in the holes by plating will leave the middle portions of the holes covered by the resists 35 unplated. Consequently, when the resists 22 and 35 are removed and the two bases are secured together back to back and the plated parts 36 are secured together by soldering or welding, then undesired thin portions of the layers 20 extending across the holes can be easily removed. The two two printed circuits arranged back to back will, therefore, have holes 37 extending completely through the bases as shown in FIG. 13.

Alternately, it is also possible in lieu of forming a printed circuit on the back base member 33, to dispense with the back base member 33 and to print circuits on the back face of the base 18.

While I have shown in FIGS. 1 to 13 holes of circular cross section formed in the two bases, it will be obvious that holes of any configuration or shape may be formed in the bases.

In FIG. 14, for example, I have shown rectangular slots 40 extending through the bases and also irregular holes such as 42, as well as round holes. Furthermore, the printing plate which removes coating 18 while in semi-liquid form from the carrier 17 may form the outline or exterior edge of the bases, such for example as shown in FIG. 14.

The construction described has the advantage that the formation of holes of any type or the formation of edges on a printed circuit may be very easily done by means of printing plates which merely contact the semi-liquid material on the carriers to remove the same from those portions on which it is not desired. Consequently, when the coating is hardened to form the base of the printed circuit, the parts which had been contacted by the printing plate will not be there.

Such printing plates can be used for forming a large number of circuits and can be produced photographically or otherwise in any usual manner. In such bases as heretofore made when quantity production is desired, it is necessary, in the first place, to make punches and dies by means of which cards or panels of rigid plastic material are then punched. The life of these punches and dies is not very long, since most plastic materials used in the manufacture of printed electrical circuits are quite tough and result in rapid wear of the punches and dies while practically no wear takes place on the printing plates when used to remove semi-liquid material from a carrier. The semi-liquid material adhering to a printing plate after contacting with the semi-liquid material on a carrier can be easily removed by wiping the plate clean and if sufficient semi-liquid material is not removed at the first contact, the plate can again be brought into contact with the carrier to remove any semi-liquid material remaining in the parts which are to be freed of this material. There consequently is substantially no wear on the printing plates.

It is sometimes required that the base be made stronger or more rigid than bases which are formed as in FIGS. 1–14, since starting with semi-liquid materials which can be removed by means of a die to which portions of the material adhere, limits the thickness of the material forming the base. The remaining figures of the drawings show how my method may be applied to the forming of holes in materials which when hardened form bases of greater rigidity and strength than those thus far described.

In the embodiment of this invention as illustrated in FIGS. 15–22, I apply a resin base or layer 50 to a carrier 49 while the base is in a thixotropic or non-flowing condition. Resinous materials of this type are well known and a detailed description of the same is not deemed necessary. For example, these resins may be prepared by starting with liquid resins of a type which may be used in the form of my invention disclosed in connection with FIGS. 1–14 such as epoxy, polyester or phenolic resins or mixtures of the same, or other resins which can be made thixotropic or resins in paste form. Inert fillers are preferably added to these resins, such as milled glass fibers, asbestos or ceramic powders. Metallic powders may be used if the base need not be an insulator and used merely to reinforce nonconducting resins not containing metallic powders as fillers. In most cases a chemical hardener is added in proportion to the desired rate of cure. Of course the hardeners may be omitted if the material is to be cured at higher temperatures. These hardeners may be of any well known type with which persons schooled in the use of plastics are familiar, such for example as aliphatic polyamines for use with epoxy resins and peroxide salts such as ketone peroxide and cobalt salt solutions if the resin is a polyester. Some plastic materials when bought in paste form from manufacturers are thixotropic or nonflowing and can be used without additions, but generally require heat to set or solidify them. Inert fillers are used to increase the dielectric strength of the base as well as the arc resistance and the physical properties.

This thixotropic plastic material is spread on a carrier 49 of any suitable material and is then ready to be operated upon by means of a die 51, that shown being provided with downwardly extending, hollow, cylindrical projections 52 if the die is to be used for forming relatively large holes in the thixotropic base material. It will be readily understood that this die plate may have other parts thereon for cooperating with the thixotropic base. For example, if small holes are to be formed in the base, the projections for forming the holes need not be hollow since they will displace only small quantities of the material. The edges of the die may be provided with downwardly extending flanges or ridges which form the edge portions of the base. These parts are formed to be pressed downwardly through the plastic material to the carrier 49 and because of the nature of the material of the base, these parts of the die will leave thin flash at the bottom of the formed thixotropic material above the carrier 49. It will be further understood that additional projections may be formed on the die plate 51 which will extend only partly into the thixotropic material to form shallow depressions therein.

Since the thixotropic material has a tendency to adhere to a die, the upper surface of this material and also all parts of the die contacting therewith should be wetted with a lubricant which may be water, for example, or other liquids, so that after the die has penetrated the material, none of the material will adhere to the die.

As the die penetrates into the thixotropic material the various projections on the die will of course displace some of the thixotropic material which may flow upwardly and produce ridges about the projections of the die plate, and in order to reduce the displacing of material as much as possible larger holes in the material are preferably formed by means of hollow cylinders, as shown at 52. When the die is removed from the material, cores 53 will be left in the material which will be connected with the body of the material only by means of flash 54.

In many cases it is desirable to have the upper surface of the base as smooth as possible and free from ridges or projections, and this can be readily accomplished by passing a roller or scraper over the upper surface of the material 50, whereupon the die may again be lowered to reform the holes originally formed in the thixotropic material, it being understood of course that the die will be mounted in a printing press or similar device by means of which the same may be moved directly downwardly repeatedly into the same positions originally occupied by the die.

After the base material, while in thixotropic condition has been hardened, either by application of heat or at room temperature, the flash and cores may be readily removed from the base, for example by means of air blasts or if the base is small, by tumbling or using conventional deflashers. At the same time any material at the edges of the base which has been partly cut therefrom by means of flanges or ridges, not shown, can be broken away so as to leave the base of the desired shape. The applying of a printed circuit on the surface and in the holes therein may then be done.

It is also possible by the use of a thixotropic resin to form printed circuits on both sides of the base. In FIG. 17 I have shown a printed circuit on a carrier 47 such as may be formed in accordance with my application for patent Ser. No. 687,120, filed Sept. 30, 1957, now Patent No. 3,024,151, granted March 6, 1952. 60 in FIG. 17 represents the parts of an electric circuit. The resin 61 of which the base is to be formed while in thixotropic or non-flowing condition, is then applied in any suitable manner. For example, by means of a plastic extruder or by otherwise spreading the same uniformly, and preferably with slight pressure, upon the carrier 47 so that the electric circuit parts 60 will be thoroughly embedded in the thixotropic resin and form with the faces of the circuit attached to the carrier 47 a substantially smooth and uninterrupted surface.

The thixotropic material while on the carrier 47 may then be acted upon by means of a die 63 which may be made of glass or metal and etched to form hollow cylinders 64 which may be used to penetrate into the thixotropic resin as described in connection with FIGS. 15 and 16. These cylinders then form a somewhat irregular upper surface on the thixotropic material which may be smoothed by any suitable means, whereupon the die is again pressed into the resin to form a series or cylindrical holes 65 therein within which cores 66 will be located and connected with other parts of the resin material by means of flash 67. The resin of the base is then hardened and the carrier peeled off, after which it is treated to remove the flash and cores, whereupon the same will be as shown in FIG. 21.

After the hardening of the resin another printed circuit may be applied to the upper face of the hardened base 61. This may be done in any suitable or desired manner. For example, in FIG. 21 I have shown a portion only of a printed circuit of this type which includes a carrier 70 having a plated metal circuit portion 71 applied thereto. This printed circuit may be formed with an outwardly extending part or dimple as shown in my application No. 687,120, filed Sept. 30, 1957, now Patent No. 3,024,151, granted March 6, 1962, which is a continuation in part of my copending application No. 464,865 of October 26, 1954, now abandoned. This dimple is placed into one of the holes in the base 61 so that it extends into proximity to the printed circuit parts 60 of the other circuit. The circuit part 71 of the upper printed circuit may be integrally connected with the circuit parts 60 on the lower face of the bse 61 in any suitable or desired manner. For example, solder in paste form, as shown at 72, may be applied to the two printed circuits at their contacting portions and this solder paste may be melted in any usual manner, for example, as by induction heating.

In FIG. 22 I have shown a bottom face view of the lower circuit as illustrated in FIG. 21. Any other means for connecting the circuit shown in FIG. 22 with the circuit parts 60 on the lower face of the plastic base may of course be employed.

While I have shown the base and the circuit parts applied thereto in flat form, they nevertheless can be readily placed in any other desired positions. While the resin is in thixotropic form it may, of course, be easily spread on a suitable temporary support so as to lie in two or more planes, and the operations herein described may be performed on the portions of the base lying in several planes. While I have described the formation of the thixotropic base material mainly for the purpose of supporting electric circuits, it will be obvious that the base may be readily molded into many different shapes for decorative or other purposes. For example, the front of a radio set may be readily formed of a base of this type with a suitable grilled opening therein formed as herein disclosed, through which the sound from the loud speaker may pass while other portions of the front panel may be provided with printed electric circuits including holes extending through the base.

The method illustrated in FIGS. 1–14 produces a very light and flexible base for a circuit such as are preferred for use in instruments where light weight and compactness are important considerations.

It will be understood that various changes in the details, materials and arrangements of parts, wihch have been herein described and illustrated in order to explain the nature of the invention, may be made by those skilled in the art, within the principle and scope of the invention, as expressed in the appended claims.

I claim:

1. A method of making a base for a printed electrical circuit which includes the steps of applying to a carrier having an unyielding surafce a thixotropic resinous material in the form of a layer which has the property of solidifying into a rigid mass, forming a hole in said layer by means of a hollow cylindrical die by pressing said die downwardly through said layer thereby forming an annular recess in said layer and a core surrounded by said annular recess and a flash connecting said core with the rest of said layer, and removing said flash and said core from said layer.

2. A method of making a base for a printed electric circuit, which includes the steps of applying to a carrier a semi-liquid resinous material which has the property of solidifying, forcing a die which has an outwardly protruding part through said material while the material is still in a semi-liquid state and before said material has solidified and to cause the material in front of said outwardly protruding part to adhere to said part and to form a hole in said material which bottoms at said carrier, removing the adhering portion of said material by withdrawing the die from said material, solidifying said material on said carrier, and removing the carrier from the solidified material so that said hole extends through the solidified material.

3. A method of making a base for a printed electric circuit which includes the steps of applying to a carrier a coating of thixotropic material which has the property of solidifying, forcing a die having an outwardly extending part thereon through said coating before said coating has solidified to form a hole in said coating and to cause material in front of said outwardly protruding part to adhere to said part, moving said die away from said carrier in a direction perpendicular to said carrier to move said outwardly protruding part out of engagement with said coating thereby removing the adhering portion of said coating from said carrier, removing from said die the material adhering thereon, and repeating the steps of forcing said die in a direction perpendicular to said carrier into the same hole in said coating until the material from the bottom of said hole has been removed from said carrier and said hole extends through said coating to said carrier, solidifying the remaining material on said carrier, and then removing said carrier from the solidified material.

4. A method of making a base for a printed electrical circuit which includes the steps of applying to a carrier a plastic layer of resinous material which has the property of solidifying, treating a die, which has a hollow outwardly protruding part, so that said material will not adhere to said die, forcing said part downwardly through said layer thereby laterally displacing portions of the material by the outwardly protruding part of said die to form an annular hole in the layer and simultaneously forming a core in said layer which is surrounded by said annular hole and a flash at the bottom of said hole connecting said core with the rest of said layer, solidifying said layer on said carrier, then removing said carrier from said layer, and then removing the cores and flash.

5. A method of making a base for a printed electric circuit which includes the steps of forming a printed circuit including a hole on a carrier, then applying a layer of resinous material on said carrier over the printed circuit, forcing a die having an outwardly protruding part thereon through said layer to laterally displace portions of said material and to form a second hole in said layer which is in registry with the first-named hole and to remove material away from selected portions of said printed circuit by means of said outwardly protruding part while leaving a flash at the bottom of the second hole, disengaging the die from said material, then solidifying said material, removing said carrier from the solidified material, and removing said flash so that the two holes merge into one hole, leaving the printed circuit embedded in the solidifying material and forming at least a part of the perimeter of the merged hole.

References Cited in the file of this patent

UNITED STATES PATENTS

| | | |
|---|---|---|
| Re. 22,290 | Teague et al. | Mar. 16, 1943 |
| 647,833 | Henricus | Apr. 17, 1900 |
| 1,563,731 | Ducas | Dec. 1, 1925 |
| 2,441,960 | Eisler | May 25, 1948 |
| 2,582,685 | Eisler | Jan. 15, 1952 |
| 2,585,108 | Gordon | Feb. 12, 1952 |
| 2,692,190 | Pritikin | Oct. 19, 1954 |
| 2,699,424 | Nieter | Jan. 11, 1955 |
| 2,728,693 | Cado | Dec. 27, 1955 |
| 2,772,501 | Malcolm | Dec. 4, 1956 |
| 2,776,235 | Peck | Jan. 1, 1957 |
| 2,793,178 | Morris | May 21, 1957 |
| 2,864,156 | Cardy | Dec. 16, 1958 |
| 2,940,018 | Lee | June 7, 1960 |

FOREIGN PATENTS

| | | |
|---|---|---|
| 134,532 | Australia | Oct. 6, 1949 |
| 570,877 | Great Britain | July 26, 1945 |

OTHER REFERENCES

"Printed Circuits," pages 14–52, November 1957, Plastics World.